Sept. 27, 1932.  C. D. AINSWORTH  1,878,999
INCLOSED ELECTRIC CONDUCTOR AND SWITCH GEAR
Filed Jan. 22, 1930  2 Sheets-Sheet 1

Inventor,
Chester D. Ainsworth
by
atty

Sept. 27, 1932.    C. D. AINSWORTH    1,878,999
INCLOSED ELECTRIC CONDUCTOR AND SWITCH GEAR
Filed Jan. 22, 1930    2 Sheets-Sheet 2
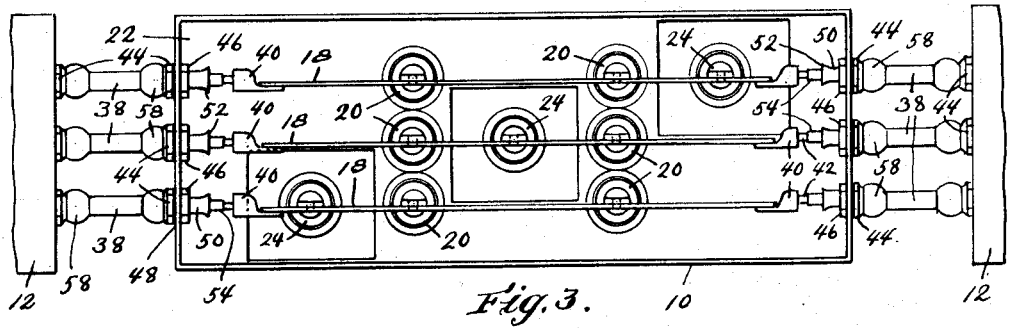
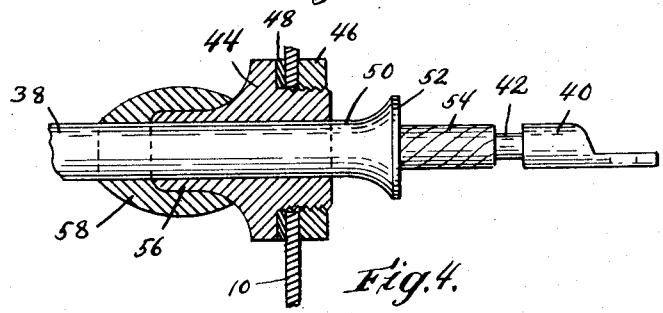
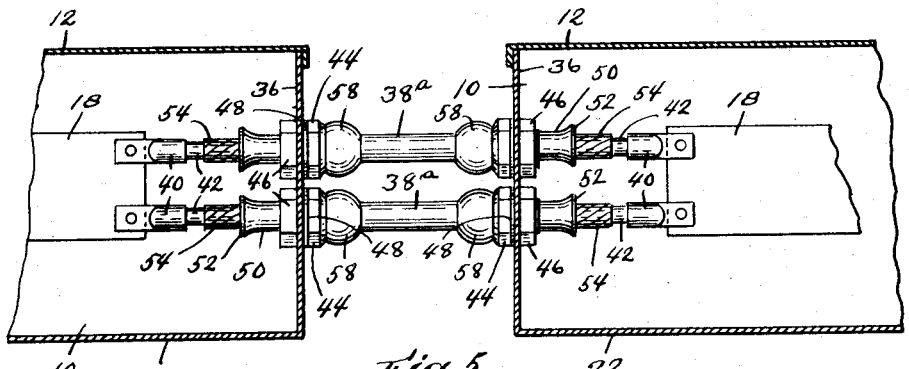
Inventor
Chester D. Ainsworth
by
atty Patented Sept. 27, 1932

1,878,999

UNITED STATES PATENT OFFICE

CHESTER D. AINSWORTH, OF WOLLASTON, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

INCLOSED ELECTRIC CONDUCTOR AND SWITCH GEAR

Application filed January 22, 1930. Serial No. 422,562.

This invention relates to metal clad switch gear.

When a metal clad switch is used for the purpose of connecting a plurality of separate high tension circuit conductors through switches to a high tension bus structure the bus conductors are commonly inclosed in a metal casing containing oil or other suitable insulation for the conductors. Insulated terminals or taps are connected with certain of the bus conductors and are extended through the inclosing casing for connection with the terminals of the switches, which switches usually are of the casing-inclosed oil-immersed type. When there are a large number of circuit conductors to be connected to the bus conductors, the bus structure and the inclosing casing necessarily has considerable length. Heretofore, it has been usual to construct the inclosing casing in long sections which are connected in a fluid tight manner in alignment and the buses in the high tension bus conductors are continuous throughout the length of the casing and between the sections. This method is electrically and mechanically satisfactory but is not commercially satisfactory since it requires a large part of the erection and assembly of the switch gear to be performed at the place of use instead of largely at the factory where the work can be done by especially skilled workmen and proper equipment and thereby at reduced expense.

An object of the present invention is to provide a metal clad switch gear wherein a structurally complete conductor inclosing casing and inclosed conductors are provided for any one switch or for any one multi-phase switching apparatus which for a three-phase system may consist of three structurally independent single phase switches which casing and the high tension conductors therein are mechanically independent of all other casings and inclosed conductors of the system. Furthermore, each pair of adjacent casings have means for connecting together the high tension conductors therein, the connecting means being preferably in the form of insulated high tension cables which extend through confronting ends of adjacent casings and are connected therewith in a fluid tight manner and have their conductors connected electrically with corresponding bus conductors in the respective casings. The construction is preferably such that the insulating connecting conductors can readily be applied by the usual workmen on the distribution system, who are well versed in the manner of handling insulated cables, and the cables are preferably flexible so that they can be installed regardless of any small lack of alignment of the adjacent inclosing casings. With this arrangement, the buses and the switches associated therewith for any one distribution circuit can be assembled in the factory and shipped to the point of use as a unit and several of these units can be connected together quickly and rapidly by the usual station workmen, thereby resulting in a considerable saving of expense and time.

A further object is generally to improve the construction and operation of armor clad switch gear.

Fig. 3 is a plan view of one of the conductor and casing units associated with a single multi-phase switching apparatus.

Fig. 4 is a sectional detail illustrating the manner of securing the connecting cable in the end wall of a casing.

Fig. 5 is a sectional detail through two adjacent casings illustrating the use of two connecting cables in parallel to transmit heavy currents between the bus conductors of the adjacent casings.

Figure 1:
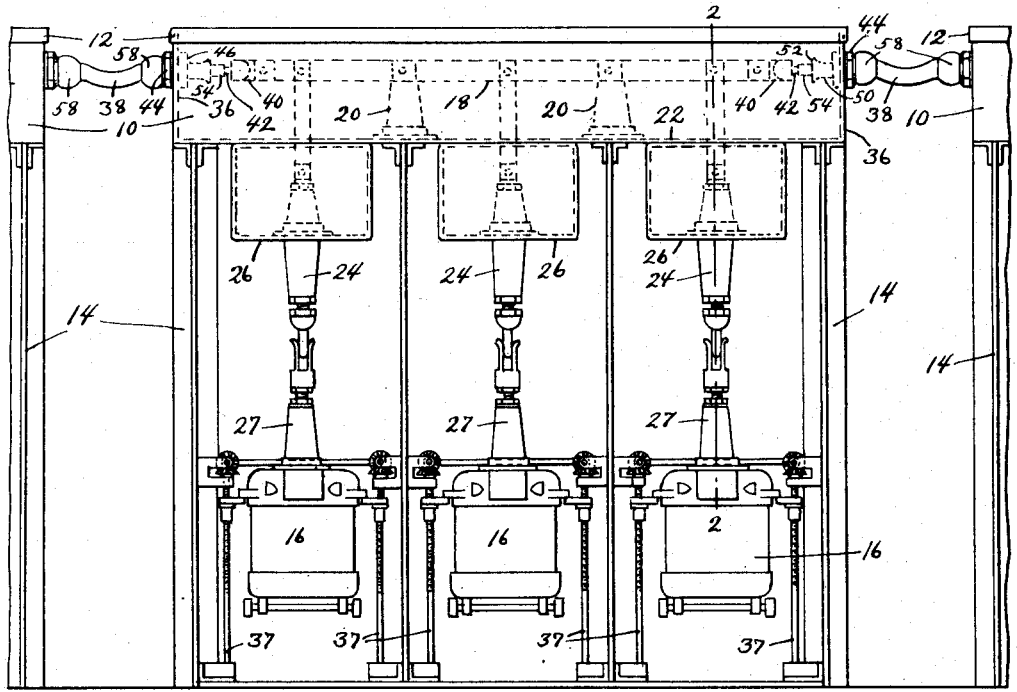
Fig. 1 is a front elevation of armor clad switch gear embodying the present invention.
Figure 2:
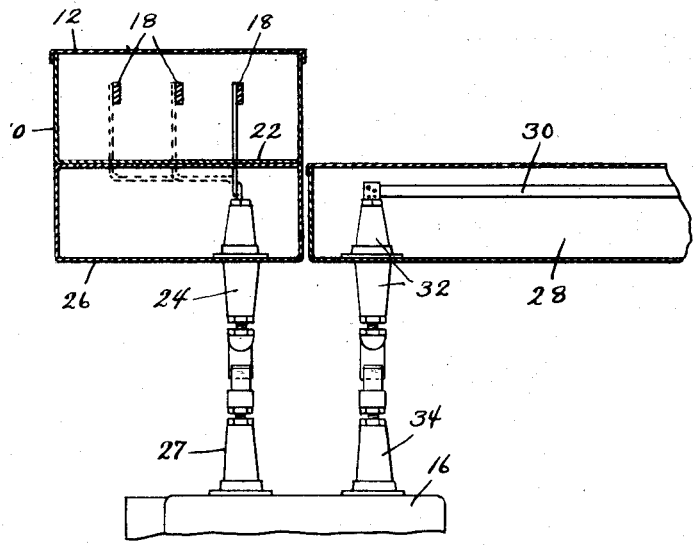
Fig. 2 is a section taken along line 2—2 of Fig. 1.

As here shown, the metal clad switch gear embodying the present invention includes a horizontally-extended metal inclosing casing 10 having a suitable cover 12 and supported in elevated position by a suitable frame 14 above a plurality of separate single phase switches 16. The system here shown is adapted for three phase operation and thus is provided with three similar switches 16 which constitute a unitary switching apparatus. Three high tension bus conductors 18 are extended horizontally of said casing in spaced relation therein and are supported on suitable insulating pedestals 20 which are carried by an intermediate wall 22 of the casing. The casing is provided with high tension terminals 24 which consist of insulating bushings that are carried by the bottom wall 26 of the casing and extend therethrough for connection with terminals 27 of the switches. The three insulated terminals 24 are each connected with a separate one of the bus conductors 18. The casing 10 is adapted to be filled with oil or other suitable insulating medium to insulate the buses from each other and from the side walls of the casing. Other casings 28 are located adjacent the casing 10 and each contains a conductor 30 which is connected to a suitable distribution circuit. Said conductor, within said casing, is connected with an insulated terminal consisting of an insulating bushing 32 that extends through the bottom wall of said casing and is adapted for connection with another switch terminal 34. Thus, each conductor 30 is connected through a separate switch with a separate one of the bus conductors 18. The switches preferably are adapted separately to be raised and lowered to bring their terminals into and out of engagement with the insulated terminals 24 and 32 by suitable means such as the screw threaded raising and lowering shafts 37.

In accordance with this invention, the bus inclosing casing 10 is provided with end walls 36 and thus is complete in itself and is adapted to hold the insulating medium without cooperation with other bus inclosing casings. The casing is associated with one particular switching apparatus only and is adapted to be supported independently of other similar casings. The bus conductors 18 are also terminated short of the end walls 36 and thus do not extend outside the casing so that the buses for each switching apparatus are structurally independent of the buses of the adjacent switching apparatus. The switching apparatus as thus described is adapted to be associated with other similar switching apparatus so that the several casings 10 are arranged in spaced relation in line as illustrated in Fig. 1. Means are provided to connect corresponding buses of adjacent casings electrically together while maintaining the casings sealed against the escape of insulating medium and also preferably in such manner that the insulating mediums in the adjacent casings are not in fluid communication so that in the event of a leak in one casing, there will be no loss of oil or other insulating mediums in the other casings. Preferably, also, the connecting means is flexible or yielding so that variations in alignment and length of the casings is not harmful. The connecting means preferably consist of short sections of commercial lead sheathed insulated cables 38, which cables are passed through the confronting ends 36 of adjacent casings and are terminated therein and have terminal connectors 40 connected with the ends of the cable conductors 42 and secured to the ends of corresponding buses in the two adjacent casings. The cables are secured to the casings in a fluid tight manner. To this end, each casing wall 36 has a bushing 44 located in the opening therein and secured removably thereto by a lock nut 46 and sealed in an oil tight manner to said casing wall by the packing 48. The lead sheath 50 of the cable extends through the bushing and is terminated within the casing in an outwardly flared end 52 for the purpose of reducing dielectric stress on the cable insulation 54 at the end of the sheath. The cable insulation is extended inwardly of the casing beyond the end of the sheath for a sufficient distance to provide a suitable length of insulation between the exposed conductor 42 and the end of the sheath. The bushing 44 is provided with a neck 56 and a mass of solder 58 in the form of a wiped joint connects the neck and the cable sheath in an oil tight manner. Preferably the cable between the casing is installed with a slight bend or sag, as illustrated, so that the cable can flex readily due to expansion and contraction of the casings. With this arrangement, the switching apparatus including the switches 16, the frame 14, and the casing 10 can be assembled at the factory and shipped as a unit so that all that is necessary when the apparatus is assembled in the distribution station is to install the cables 38, which can be done by the usual station workmen who are generally skilled in the handling of metal sheathed flexible cables. If any one switching apparatus should fail, the cables 38 which connect it with adjacent sections can be removed thereby isolating the section from the system without the necessity for shutting down the entire system. The sections on each side of the faulty section can be connected together temporarily by cables installed in a manner similar to the cables 38 so that all of the system, except the faulty section, can be operated. If the current traversing the bushings structure is too heavy for the carrying capacity of a single cable 38, a plurality of such cables can be connected in parallel as shown in Fig. 5 where a plurality of cables 38a are connected in parallel to the buses 18.

I claim:

1. Metal clad switch gear consisting of a plurality of sets of electric switching apparatus each having a conductor inclosing a casing that is structurally independent of all other casings, a plurality of high tension conductors contained entirely within each of said casings, and flexible insulated high tension cables extended through confronting walls of said casings and secured to said walls in a fluid tight manner and having their conductors connected with corresponding inclosed conductors in adjacent sections, whereby to electrically connect the conductors of the casing flexibly.

2. Metal clad switch gear consisting of a plurality of sets of electric switching apparatus each having a conductor inclosing casing that is free from rigid connection with all other casings, a plurality of high tension conductors contained entirely within each of said casings, and insulated high tension cables extended through confronting walls of said casings and secured to said walls in a fluid tight manner and having their conductors connected with corresponding inclosed conductors in adjacent sections, whereby to electrically connect the conductors of the casings, said cables being flexible and having flexible metallic inclosing sheaths, and means securing said sheaths in a fluid tight manner to the confronting end walls of said casings.

3. Armor clad switch gear including two independent bus inclosing casings disposed in spaced and confronting relation, sections of rigid high tension buses contained entirely in said casings, switching apparatus associated separately with said buses, means connecting the corresponding buses of said casings including short flexible high tension cables extended across the space between said casings and passed through the confronting walls thereof and having their conductors connected with the buses in the two casings, and means sealing said casings in a fluid-tight manner at said cables.

4. Armor clad switch gear including two independent bus inclosing casings disposed in spaced and confronting relation, high tension bus-sections contained entirely in said casings, switching apparatus associated separately with both of said bus-sections, means connecting the corresponding bus-sections of said casings including high tension insulated cables extended across the space between said casings and passed through the confronting wall thereof and having their conductors connected with the corresponding bus-sections in the two casings, and means sealing said casings in a fluid tight manner at said cables, said insulated cables being flexible in the space between said casings.

5. In an electric distribution system the combination of two independent fluid containing conductor inclosing casings which are spaced apart and have confronting walls, a separate high tension conductor contained entirely in each casing, and means connecting said conductors including an insulated high tension cable extended across the space between said casings and through the confronting walls thereof and having the opposite ends of its conductor each connected with one of said casing conductors, and means to seal said casings in a fluid tight manner at their junction with said high tension cable.

6. In an electric distribution system the combination of two independent fluid containing conductor inclosing casings which are spaced apart and have confronting walls, a separate high tension conductor contained entirely in each casing, and means connecting said conductors including an insulated high tension cable extended across the space between said casings and through the confronting walls thereof and having the opposite ends of its conductor each connected with one of said casing conductors, and means to seal said casings in a fluid tight manner at said high tension cable conductor, said cable being flexible, in the space between said casings.

7. In an electric distribution system, the combination of two independent fluid containing conductor inclosing casings which are spaced apart and have confronting walls, a separate high tension conductor contained entirely in each casing, and means connecting said conductors including an insulated high tension cable extended across the space between said casings and through the confronting walls thereof and having the opposite ends of its conductor each connected with one of said casing conductors, and means to seal said casings in a fluid tight manner at said cable conductor, said high tension cable conductor having an outer metal sheath which is electrically connected with both of said casings and is sealed thereto in a fluid tight manner.

8. In an electric distribution system, the combination of two separate but closely-spaced fluid-retaining conductor-inclosing casings each having an insulated high tension conductor contained entirely therein, switching apparatus associated with said conductors, and means connecting said conductors including a flexible metal sheath extended across the space between said casings and connected in a fluid tight manner with confronting walls thereof, and an insulated high tension cable extended through said sheath and into both casings and having its conductor connected to the conductors of both sections.

In testimony whereof, I have signed my name to this specification.

CHESTER D. AINSWORTH.